April 16, 1968  P. G. FORET  3,378,121
VACUUM OPERATED CLUTCH AND BRAKE WITH MAGNETIC VALVE
Filed Oct. 20, 1965  2 Sheets-Sheet 1

INVENTOR.
PIERRE G. FORET
BY Wolf, Greenfield + Hieken
ATTORNEYS

April 16, 1968     P. G. FORET     3,378,121
VACUUM OPERATED CLUTCH AND BRAKE WITH MAGNETIC VALVE
Filed Oct. 20, 1965     2 Sheets-Sheet 2

INVENTOR.
PIERRE G. FORET
ATTORNEYS

United States Patent Office 3,378,121
Patented Apr. 16, 1968

3,378,121
VACUUM OPERATED CLUTCH AND BRAKE
WITH MAGNETIC VALVE
Pierre G. Foret, Sudbury, Mass., assignor to
P. G. Foret Inc., Sudbury, Mass.
Filed Oct. 20, 1965, Ser. No. 498,222
10 Claims. (Cl. 192—18)

ABSTRACT OF THE DISCLOSURE

A novel electro-vacuum valve is provided with a closure member which is vacuum operated to close a vacuum passageway and electrically actuated to open said passageway to a vacuum source. The valve is constructed to permit minimum actuator travel. Electro-vacuum clutch brakes and brakes are also disclosed which preferably incorporate a resilient flexible disc which is actuated by a vacuum to provide coupling and uncoupling in an intermediate motion device. Thus, the device of this invention is useful in intermittent coupling for a variety of industrial applications including recording tape winders, tape transports, textile machinery, copying machines, machine tool positioning, indexing and others.

During the last decade, extensive research has results in great advances in electronics while comparatively little progress has been achieved in the field of mechanics accompanying electronic developments. Often systems are limited by the sluggishness of on-off responses of mechanical devices particularly above the subfractional horsepower range. Among the known mechanisms for preforming intermittent rotational coupling are various types of clutches. These clutches primarily transmit torque between a driving and a driven member and are used in thousands of coupling, braking, controlled slipping, cycling, reversing and other applications. Of the at least eight major types of clutch constructions known, only two, are generally used for operation at cycling frequency above a few cycles per second at a rated torque in excess of 20 inch pounds, i.e., magnetic particle clutches and magnetic solenoid clutches. Such clutches are limited in that as torque rating increases, so does the electrical inertia due to coil inductance making for sluggish on-off actuation. Known clutches are further limited by the inability to dissipate heat created by friction between an armature and coupling member during actuation.

An important object of this invention is to provide an electro-vacuum means which has extremely fast actuation time particularly in the fractional horsepower clutching range and extremely fast switching time in both clutch and brake constructions.

Another important object of this invention is to provide an electro-vacuum means in accordance with the preceding object which has high operating frequency at high rated torque.

Still another object of this invention is to provide an electro-vacuum means in accordance with the preceding objects which is extremely durable and rugged, having long life at competitive cost with other known clutching or braking means.

According to the invention, an electro-vacuum valve is provided with a housing defining a valve chamber, an inlet port, a vacuum port and a vacuum passageway all opening into the chamber. A movable closure member is positioned between the gas inlet port and the vacuum port for interrupting free passage of gas from the gas inlet port to the vacuum passageway in one position of the member and interrupting free passage of gas from the vacuum port to the vacuum passageway in a second position thereof. An electromagnetic means moves the closure member into one position preferably against the force of a vacuum and the vacuum moves the closure member into the second position.

Preferably the valve is incorporated in a clutch or brake construction with a vacuum chamber located behind a flexible coupling disc and interconnected with a valve vacuum passageway. Preferably the disc is spaced slightly at its outer rim from a member to which it couples a rotatable shaft. Upon creation of a vacuum in the vacuum chamber, the disc flexes to couple the shaft with the member and upon subsequent release of the vacuum, the disc returns to its original configuration due to its inherent resiliency.

The valve of this invention when used with a brake or clutch construction of this invention, can have responses at least as low as 0.0007 second to close and 0.0018 second to open. Clutches in accordance with this invention can have maximum heat load frequency ratings at least 50% higher than known clutching devices. The valve can be simply constructed with few tolerances permitting valve life in excess of 500,000,000 cycles. Torque ratings can be well over 25 inch pounds.

These and other objects, advantages and features of the present invention will be better understood from the following description when considered in the light of the accompanying drawings in which.

Figure 1:
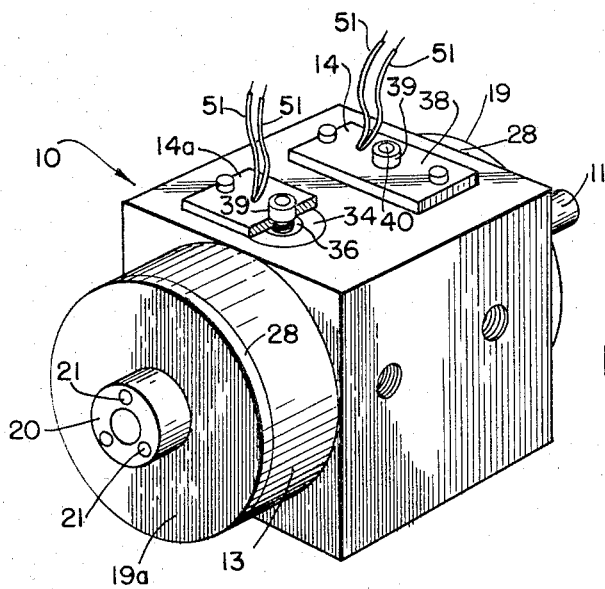
FIG. 1 is a perspective view of a preferred embodiment of this invention.

With reference now to the drawing and more particularly FIG. 1 an electro-vacuum clutch-brake is illustrated at 10 having a shaft 11 with its associated coupling assembly, a fixed housing 12, a flywheel 13 and a pair of identical actuator assemblies 14, 14a. The housing 12 is preferably generally rectangular in cross section with a pair of threaded mounting bores 15 for mounting the clutch brake on a fixed base not shown. A passageway 16 is preferably provided passing inwardly of the metallic housing to a preferably centrally located freely rotatable shaft 11 mounted on conventional thrust bearings 17 and 18 which are in turn fixed to the housing and permit free rotation of the shaft 11 independently of the housing 12. The passageway 16 permits lubrication of the shaft bearings and can aid heat dissipation from the housing.

Figure 2:
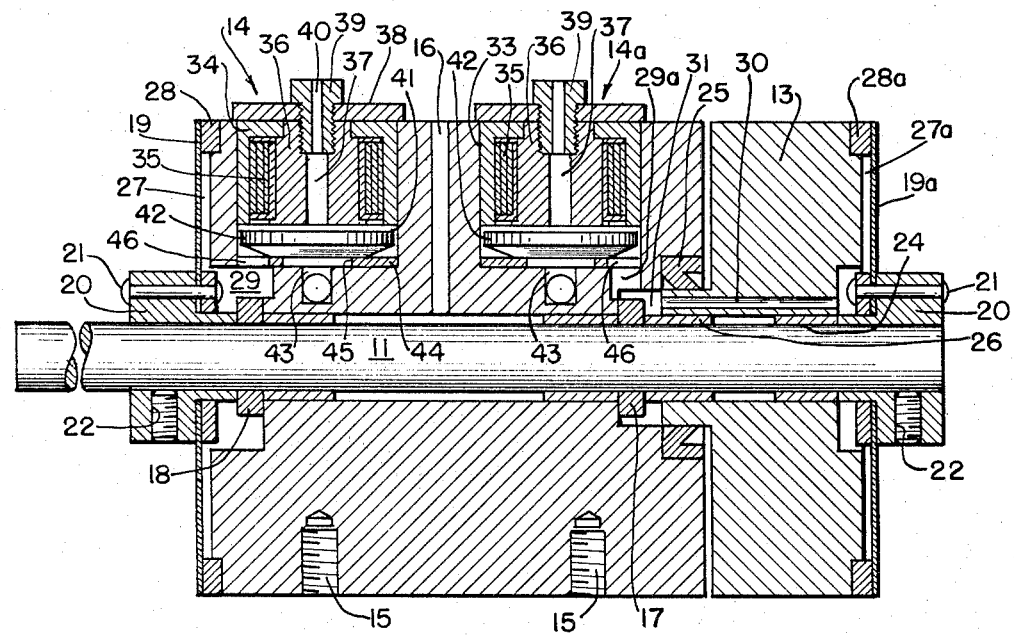
FIG. 2 is a cross sectional view through the center thereof.

The left hand end of the housing as seen in FIG. 2 carries a thin circular coupling disc 19 which acts as a coupling member in a brake construction of the clutch brake. The disc 19 is fixed at its center to the shaft 11 by means of a collar 20 and at least one rivet 21. The collar 20 is fixed to the shaft 11 preferably through a lock screw (not shown) passing through threaded bore 22. Of course conventional means such as welding, soldering or braising can be used to form the connections between the metallic elements of this invention.

The right hand end of the shaft 11 as seen in FIG. 2, carries the flywheel 13 which can act as a drive member for the clutch brake, as for example, when linked with a drive motor by means of a conventional pulley belt (not shown). The flywheel 13 is rotatably mounted on the shaft 11 by suitable ball bearings illustrated semidiagrammatically at 24.

A rotary seal is provided between the flywheel 13 and the housing 12. The rotary seal comprises a hard rubber ring 25 seated in a circular recess in the housing forming a lip rotary seal with the shaft. The flywheel is mounted on the shaft 11 by conventional porous bronze bearings 24 and 26 which additionally act to effectively prevent gas leakage along shaft 11 in flywheel 13. Other mounting means can be used for the flywheel so long as provision is made for a substantially air tight seal between the shaft and the flywheel and the flywheel and housing while permitting rotation of the flywheel with respect to each.

The right hand end of the shaft 11 carries a coupling disc 19a mounted by identical components as used for mounting the preferably identical coupling disc 19. A vacuum chamber 27 is provided between the disc 19 and the end of the housing 12 by an annular stepped cavity formed by projection of ring 28 and a suitable indentation in the housing. The friction ring 28 is fixed to the housing preferably spaced slightly from the resting plane of the disc 19. Similarly a friction ring 28a and vacuum chamber 27a are provided on the flywheel at the right hand side of the housing. The friction rings are preferably composed of a hard resilient rubber and provide a dampening effect to the coupling discs. The vacuum chamber 27a communicates with the actuator assembly 14a through a bore 30 extending through and preferably parallel to the axis of the flywheel to a vacuum passageway 29a. The bore 30 communicates with the vacuum passageway 29a throughout rotation of the flywheel due to the circular recess 31 provided in the housing. Similarly chamber 27 communicates with the actuator assembly 14 through vacuum passageway 29.

Only the brake actuator assembly 14 will be fully described in order to simplify the description since both actuator assemblies are identical and identical reference numerals refer to identical parts. The actuator assembly 14 is snugly received in air tight relationship in a suitable circular bore 33 provided in the housing 12. The actuator assemblies act as valves to switch the coupling discs 19 and 19a upon suitable electrical actuation as will be later described. The brake valve 14 has a circular casing 34 carrying a conventional electromagnet 35 about a core 36 having a central preferably axially extending gas inlet port 37. Elements 34, 35 and 36 are fixed to a mounting plate 38 preferably by a headed bolt 39 screw threaded to the inside wall of bore 37 with the bolt 39 having a bore 40 axially aligned with the bore of gas inlet port 37. A valve chamber 41 is formed by the bore 33 of the housing 12 in conjunction with the lower end of the valve.

Within the chamber 41 is positioned a flapper disc or movable closure member 42 having a diameter less than the diameter of bore 33 to provide for direct communication between the gas inlet port 37 and the vacuum passageway 29 when the closure member is in the position shown in FIG. 2. Preferably the disc 42 is not in any way connected with the housing or other portions of the valve so that it is truly floating and it is formed of a magnetic material such as iron or steel.

Figure 3:
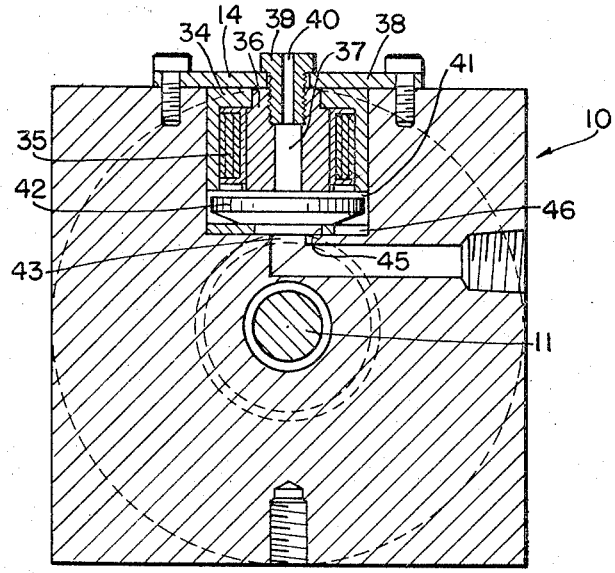
FIG. 3 is a cross sectional view taken through FIG. 2.

The flapper 42 has a first preferably planar portion facing the gas inlet port 37 and a second planar surface portion facing a vacuum port 43 which extends to the outside of the housing as best shown in FIG. 3 for connection to a suitable vacuum supply source such as a vacuum pump. The orifice of the bore 43 is effectively increased in size preferably by the use of a ring 44 having a bore 45 preferably axially aligned with bore 43. A notch 46 is provided to allow communication between the valve chamber and the vacuum passageway 29. Ring 44 may be fixed to the housing 12 or may be loosely mounted therein as desired. Preferably the underside of the disc 42 is frusto-conical to maximize magnetic flux from the electromagnet 35.

The valve 14 is mounted in the housing by mounting plate 38 preferably by means of bolts such as 50 shown in FIG. 3 although any suitable mechanical means may be used. In some cases, an air tight sealing gasket can be provided between the plate 38 and the housing 12.

From the above description, it will be understood that the tolerances for the flapper, the vacuum port, gas inlet port and other components need not be extremely precise. The floating nature of the flapper is important and its diameter may be substantially smaller than the diameter of bore 33 so long as the movement of the flapper is not restricted within the bore upon actuation.

Electrical leads 51 are provided for each valve connected to a suitable on-off electrical switch (not shown) for actuation of the valves.

Turning now to the operation of the preferred embodiment of the electro-vacuum clutch brake 10, it is shown in its resting position in FIG. 2. The flywheel 13 is connected with a drive belt or chain to an electric motor (not shown) giving constant rotation to the flywheel. Each of the valve vacuum ports 43 are connected with a constant vacuum source such as a vacuum pump (not shown) providing a constant vacuum, holding flapper discs 42 in the position shown in FIG. 2. To actuate the shaft 11, electromagnet 35 is actuated pulling the disc 42 against the force of the vacuum to block the air inlet 37 of the drive valve 14a. This action simultaneously interconnects the vacuum port 43 with the vacuum passageway 29 and pulls air out of the vacuum chamber 27a at a faster rate than air can enter from the periphery of the disc at the gap between the friction ring 28 and the rim of the disc. Thus the coupling disc 19a is resiliently flexed from its plane by atmospheric air pressure and pulled into coupling engagement with the friction ring 28a rotating with the flywheel 13 and consequently rotating and driving shaft 11 at the speed of rotation of the motor. When it is desired to disengage the shaft 11, current to the electromagnet 35 of valve 14a is stopped and it is deactuated, whereupon the force created by air pressure acting on the upper surface through the air inlet port 37 in conjunction with the vacuum created by the vacuum port 43 pulls the flapper into the position shown in FIG. 2 allowing air to enter behind the disc 19a and disconnecting the shaft 11 from the driving flywheel 13. The brake valve 14 can be simultaneously actuated to allow passage of electric current to electromagnet 35 raising the flapper valve 42 in the same manner against the force of the vacuum and thereby creating a vacuum in the vacuum chamber 27 and engaging disc 19 with the friction ring 28 bringing the shaft 11 to an immediate stop even though the flywheel 23 continues its rotation. Preferably a conventional switch is used to simultaneously actuate the brake valve when the clutch valve is deactuated and conversely actuate the clutch valve when the brake valve is deactuated. Separate manually actuated switches can be used if desired.

It should be understood that there is a balance of forces on each flapper 42 at all times thus, when an electromagnet 35 is actuated, it pulls the corresponding flapper disc against the force of the vacuum. When the electromagnet 35 is deactuated, because of the existing vacuum, immediate response is obtained from the flapper to close the vacuum port due to the fact that the vacuum is always behind or under the disc. The throw or maximum upward or downward movement of the valve can be large while still maintaining extremely fast on-off response in view of the balance of forces acting on the disc. By using ring 44 to predetermine the undersurface area of the flapper disc on which the vacuum acts on, the force created by the vacuum can easily be preselected as desired. Preferably the electromagnet creates a force only slightly greater than the vacuum force thus if the force on the upper surface of the disc is approximately 14.7 pounds per square inch, the pull of the electromagnet is adjusted to be only slightly greater than this and when released, instantaneous response is accomplished.

Figure 4:
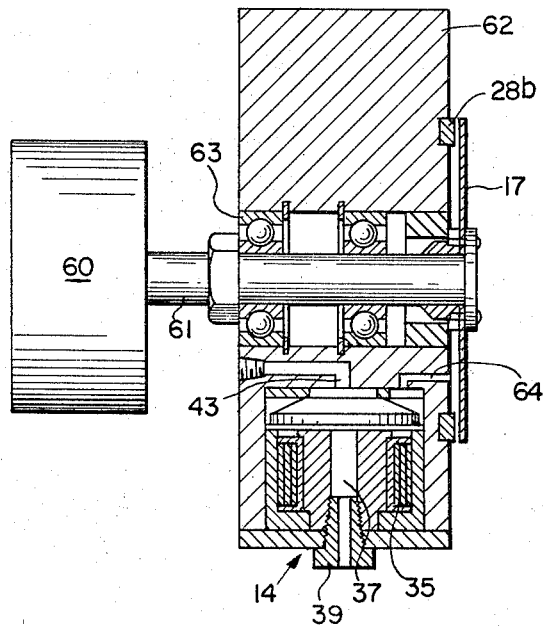
FIG. 4 is a cross sectional view through the center of an alternate embodiment of the invention.

Turning now to the alternate embodiment of the invention shown semidiagrammatically at FIG. 4, the electro-vacuum valve 14 is identical to the valve 14 shown in the embodiment of FIG. 1. In this embodiment the valve is used in an electro-vacuum brake where a load 60 is mounted on a freely rotatable shaft 61 in turn rotatably mounted on a fixed housing 62 by preloaded bearings 63. Friction ring 28b is fixed to the housing and may be constructed of silicon rubber as in the friction rings described with the embodiment of FIG. 1. The disc 19 as used in FIG. 1 is fixed to the shaft to provide a vacuum chamber 27 substantially as previously described. The vacuum passageway 64 interconnects the vacuum chamber 27 with the valve chamber 41 as previously described. When the shaft 61 is rotated by a drive means not shown, the load 60 is rotated and can be stopped substantially instantaneously by actuating the electromagnet 35 to create a vacuum in the chamber 27 and flex the outer marginal portion of coupling disc 19 into engagement with the friction ring 28b stopping movement of the shaft 61 as previously described. When electromagnet 35 is deactuated, flapper 42 is instantaneously forced into engagement with and closes vacuum port 43 permitting free rotation of the shaft 61.

It is a feature of the invention that the provision of the air gap between the friction ring and the annular marginal portion of the coupling disc provides for flow of air through the clutch or brake construction acting to cool the components and permitting rapid dissipation of any heat built up in the clutch.

Preferably the coupling discs of this invention are flat metallic discs and in the preferred embodiment are aluminum discs having a thickness of 0.032" with a diameter of 3.5". Such discs can be deflected several thousandths of an inch at their periphery by pneumatic pressure differentials of less than 3 pounds per square inch. The cupping of the disc or conical deflection produced provides an inbalance of forces such that rapid return of the discs is possible to their original shape upon removal of pneumatic pressure differential. Such discs can transmit static torques of 56 inch pounds and higher. Preferably the ratio of actuator vacuum inlet port opening area to the vacuum chamber leakage are at the periphery of the disc is at least two to one to provide high pneumatic efficiency. Preferably the minimum valve port area for the gas inlet port is equivalent to a ¼ inch diameter bore. The valve throw or linear distance of movement of the flapper disc along its axis is preferably 0.030 inch in the preferred embodiment. These values permit switching of an unsupported flapper disc of minimum mass with optimum magnetic and pneumatic forces through a large valve throw while eliminating substantially all operational wear problems of conventional valves and permitting valve life calculated in excess of 500,000,000 cycles.

In an example of the embodiment of FIG. 4, the dimensions indicated above were used. The air inlet port opening area was ¼ inch diameter, effective vacuum port area opening ½ inch diameter, flapper disc diameter 1 3/16 inches, and the electromagnet had 200 turns and energized with a current of 1 amp. The shaft 61 had a diameter of ½ inch. The vacuum pump used for connection to the vacuum port displaced three times the total volume contained in the vacuum passageway 64 and in the vacuum cavity. The air gap between the friction ring and the disc was 0.010 inch and it was observed that the metallic cupper effect of the disc provides an extremely rapid disc release and engagement with excellent damping characteristics. At a vacuum inlet negative pressure of 11 inches of mercury the response of the valve was 0.007 second to close, i.e. vacuum operated and 0.0018 second to open, i.e., electromagnetically operated by unassisted direct current. The brake acted to stop the shaft with a resulting torque of 25 inch pounds and to release the shaft at a frequency range of 0 to 66 cycles per second where one cycle is equal to two commands, that is, on and off.

While specific embodiments of this invention have been described and claimed, it should be understood that many variations are possible. Thus, the specific dimensions recited may vary greatly depending upon the torque output and response time desired. While the device is particularly suitable for braking and clutching of fractional horsepower drive means, it can easily be adapted for use at higher horsepower ratings. The valve or actuator assembly of this invention can be used for a variety of applications where intermittent switching of a vacuum source is desired.

I claim:

1. An electro-vacuum means for clutching or braking rotational movement of a shaft, said means comprising:
    a stationary housing,
    a rotatable shaft passing through said housing,
    said shaft carrying a thin resilient disc mounted thereon and capable of flexing at an annular marginal portion thereof when a force is applied to one side thereof and elastically returning to its original unflexed condition when said force is removed,
    said disc lying substantially close to said housing to define a vacuum chamber therebetween open to the atmosphere at the periphery of said disc,
    an annular friction ring mounted on said housing spaced from said marginal portion and constructed and arranged to close said vacuum chamber and couple said housing with said shaft upon flexing of said disc,
    and means carried by said housing for selectively creating a vacuum in said vacuum chamber to couple said shaft and housing upon electrical actuation.

2. An electro-vacuum means in accordance with claim 1 wherein said last mentioned means comprises:
    said housing defining a valve chamber, an inlet port, a vacuum port and a vacuum passageway interconnected with said vacuum chamber, all opening into said valve chamber,
    a movable closure member positioned between said gas inlet port and said vacuum port for interrupting free passage of gas from said gas inlet port to said vacuum passageway in one position thereof and interrupting free passage of gas from said vacuum port to said vacuum passageway in a second position thereof,
    and electromagnetic means for moving said closure member into said one position.

3. An electro-vacuum means in accordance with claim 2 wherein said valve chamber has opposed walls and said gas inlet port and said vacuum port are located on said opposed walls.

4. An electro-vacuum means in accordance with claim 2 wherein said closure member is frusto-conical in shape and said electromagnetic means are positioned outwardly of said gas inlet port.

5. An electro-vacuum means in accordance with claim 1 wherein said space between said friction ring and said disc is no greater than about 0.010 inch.

6. An electro-vacuum-brake for braking and clutching a rotatable shaft, comprising:
    a stationary housing, a flywheel, and a rotatable shaft mounted in said housing and said flywheel,
    said shaft carrying a first and a second thin resilient disc with each disc being capable of flexing at an annular marginal portion thereof when a force is applied to one side thereof and elastically returning to its original unflexed condition when said force is removed,
    said first disc lying substantially close to said housing to define a first vacuum chamber therebetween and said second disc lying substantially close to said flywheel to define a second vacuum chamber therebetween,
    a first annular friction ring mounted on said housing spaced from the marginal portion of said first disc and constructed and arranged to close said first vacuum chamber and couple said housing and said shaft upon flexing of said disc, a second annular friction ring mounted on said flywheel spaced from said marginal portion and constructed and arranged to close said second vacuum chamber and couple said flywheel with said shaft upon flexing of said second disc, and means carried by said housing for selectively creating a vacuum in at least one of said vacuum chambers to selectively couple said shaft with said housing and said shaft with said flywheel.

7. An electro-vacuum clutch-brake in accordance with claim 6 wherein said last mentioned means comprises said housing defining a valve chamber, an inlet port, a vacuum port and a vacuum passageway interconnected with said first vacuum chamber all opening into said valve chamber,
a movable closure member positioned between said gas inlet port and said vacuum port for interrupting free passage of gas from said gas inlet port to said vacuum passageway in one position thereof and interrupting free passage of gas from said vacuum port to said vacuum passageway in a second position thereof,
and electromagnetic means for moving said closure member into said one position.

8. An electro-vacuum clutch-brake in accordance with claim 7 wherein said movable closure member comprises a floating frusto-conical disc.

9. In an intermittent motion device,
a coupling disc fixedly mounted on a rotatable shaft having an axis with said shaft being restrained from movement along its axis,
said disc comprising a thin, resilient material capable of elastically deflecting under a force created by atmospheric air pressure at sea level,
a wall carrying a friction ring spaced from said disc and defining a vacuum chamber on one side of said disc with said chamber being open to the atmosphere when said disc is not flexed,
and means for evacuating said chamber to cause said disc to flex into engagement with said friction ring and couple said shaft with said wall.

10. In an intermittent motion device in accordance with claim 9, said disc being spaced a distance no greater than 0.010 inch from said friction ring.

References Cited

UNITED STATES PATENTS

| | | | |
|---|---|---|---|
| 2,267,515 | 12/1941 | Wilcox et al. | 251—139 X |
| 2,289,456 | 7/1942 | Ray | 251—141 X |
| 2,818,949 | 1/1958 | Giffen | 192—18.1 |
| 2,861,594 | 11/1958 | Collins | 251—141 X |
| 2,881,980 | 4/1959 | Beck et al. | 251—141 X |
| 2,929,270 | 3/1960 | Tuck et al. | 192—88 X |
| 3,289,905 | 12/1966 | Pitt et al. | 251—141 X |

FOREIGN PATENTS 124,606 10/1901 Germany.

BENJAMIN W. WYCHE III, *Primary Examiner.*